US012809535B2

(12) United States Patent
Khan et al.

(10) Patent No.: US 12,809,535 B2
(45) Date of Patent: Nov. 24, 2026

(54) METHODS AND SYSTEMS FOR MEMORY BELT ARCHITECTURE MANAGEMENT

(71) Applicant: SK Hynix NAND Product Solutions Corp., Rancho Cordova, CA (US)

(72) Inventors: Mohammad Nasim Imtiaz Khan, Rancho Cordova, CA (US); Gulzar Kathawala, Fremont, CA (US); Yogesh Wakchaure, Folsom, CA (US)

(73) Assignee: Solidigm Inc., Rancho Cordova, CA (US)

( * ) Notice: Subject to any disclaimer, the term of this patent is extended or adjusted under 35 U.S.C. 154(b) by 4 days.

(21) Appl. No.: 19/005,901

(22) Filed: Dec. 30, 2024

(65) Prior Publication Data

US 2026/0186673 A1 Jul. 2, 2026

(51) Int. Cl.
*G06F 3/06* (2006.01)

(52) U.S. Cl.
CPC .......... *G06F 3/0626* (2013.01); *G06F 3/0659* (2013.01); *G06F 3/0679* (2013.01)

(58) Field of Classification Search
CPC ..... G06F 3/0626; G06F 3/0659; G06F 3/0679
See application file for complete search history.

(56) References Cited

U.S. PATENT DOCUMENTS

| | | | | |
|---|---|---|---|---|
| 8,078,921 | B2 | 12/2011 | Kojima et al. | |
| 8,156,405 | B1 * | 4/2012 | Lumb | G06F 11/1092 714/770 |
| 2005/0278568 | A1 | 12/2005 | Delaney | |
| 2015/0161000 | A1 | 6/2015 | Kim et al. | |
| 2017/0046073 | A1 * | 2/2017 | Guo | G06F 3/0679 |
| 2019/0102253 | A1 * | 4/2019 | Televitckiy | G06F 11/1076 |
| 2020/0104210 | A1 * | 4/2020 | Roll | G06F 11/108 |
| 2020/0110537 | A1 * | 4/2020 | Hahn | G06F 3/061 |
| 2020/0110661 | A1 * | 4/2020 | Singidi | G06F 3/061 |
| 2020/0174685 | A1 | 6/2020 | Lee et al. | |
| 2020/0326857 | A1 * | 10/2020 | Paley | G06F 3/0679 |
| 2021/0096951 | A1 * | 4/2021 | Kotzur | G06F 11/1076 |
| 2022/0083221 | A1 * | 3/2022 | Agarwal | G06F 3/0619 |
| 2022/0283728 | A1 * | 9/2022 | Kong | G06F 3/0604 |
| 2023/0376212 | A1 | 11/2023 | Chae | |

* cited by examiner

*Primary Examiner* — Ryan Bertram
(74) *Attorney, Agent, or Firm* — HG LAW LLP

(57) ABSTRACT

A method is performed by processing circuitry of a storage device, the processing circuitry to calculate first parity data based on a first set of memory blocks of a first belt of a memory, to cause the first parity data to be written to a first parity area of a second belt of the memory, where the second belt is different from the first belt, to calculate second parity data based on a second set of memory blocks of a third belt of the memory, where the third belt is different from the first belt, to calculate third parity data based on the first parity data and on the second parity data, and to cause the third parity data to be written to a designated parity memory of the memory distinct from the first, the second, or the third belt of the memory.

18 Claims, 6 Drawing Sheets

METHODS AND SYSTEMS FOR MEMORY BELT ARCHITECTURE MANAGEMENT

TECHNICAL FIELD

The present disclosure is directed to methods and systems for memory belt architecture management with cascaded writing of parity data, and optionally cascaded writing of additional data.

SUMMARY

In accordance with the present disclosure, methods and systems are provided for memory belt architecture management with cascaded writing of parity data (e.g., using XOR logic), and optionally cascaded writing of additional data stored in memory. Compared to other approaches, the methods and systems disclosed herein may lower the required spare area (e.g., extra memory to store parity data for the user data), lower the write amplification factor (WAF, i.e., a ratio of bytes written to storage over bytes written to the database), and lower the required endurance (i.e., lifetime of the device, as may be defined by maximum number of program/erase cycles) in storage devices.

In accordance with some embodiments of the present disclosure, a method for writing data to a storage device is performed by processing circuitry (e.g., of a memory controller) of the storage device. The method includes calculating first parity data based on a first set of memory blocks of a first belt of a memory, causing the first parity data to be written to a first parity area of a second belt of the memory, where the second belt is different from the first belt, calculating second parity data based on a second set of memory blocks of a third belt of the memory, where the third belt is different from the first belt, calculating third parity data based on the first parity data and on the second parity data, and causing the third parity data to be written to a designated parity memory of the memory distinct from the first belt of the memory, from the second belt of the memory, and from the third belt of the memory.

In some embodiments, the method also includes causing the first parity data to be erased from the first parity area after writing the third parity data to the designated parity memory of the memory.

In some embodiments, calculating the first parity data, the second parity data, and the third parity data includes using one or more XOR operations.

In some embodiments, the first set of memory blocks and the second set of memory blocks include quad-level cell (QLC) blocks.

In some embodiments, the first parity area includes single-layer cell (SLC) blocks.

In some embodiments, the third belt of the memory is the same as the second belt of the memory.

In some embodiments, the designated parity memory of the memory is a parity die.

In some embodiments, the first belt of the memory, the second belt of the memory, and the third belt of the memory are components of a band of the memory. Further, the first belt of the memory, the second belt of the memory, and the third belt of the memory may each include a respective plurality of dies, and each respective die of each respective plurality of dies may include a plurality of memory blocks.

In some embodiments, the first belt of the memory includes a first user area and a first system area, where the first user area includes the first set of memory blocks, and the second belt of the memory includes a second user area and a second system area, where the second system area includes the first parity area.

In some embodiments, calculating the second parity data is further based on the first parity data.

In accordance with some embodiments of the present disclosure, a memory storage device includes memory and processing circuitry (e.g., of a memory controller) coupled to the memory. The processing circuitry is to calculate first parity data based on a first set of memory blocks of a first belt of the memory, cause the first parity data to be written to a first parity area of a second belt of the memory, where the second belt is different from the first belt, calculate second parity data based on a second set of memory blocks of a third belt of the memory, where the third belt is different from the first belt, calculate third parity data based on the first parity data and on the second parity data, and cause the third parity data to be written to a designated parity memory of the memory distinct from the first belt of the memory, from the second belt of the memory, and from the third belt of the memory.

In some embodiments, the processing circuitry is further to cause the first parity data to be erased from the first parity area after writing the third parity data to the designated parity memory of the memory.

In some embodiments, calculating the first parity data, the second parity data, and the third parity data includes using one or more XOR operations.

In some embodiments, the first set of memory blocks and the second set of memory blocks include quad-level cell (QLC) blocks.

In some embodiments, the first parity area includes single-layer cell (SLC) blocks.

In some embodiments, the third belt of the memory is the same as the second belt of the memory.

In some embodiments, the designated parity memory of the memory is a parity die.

In some embodiments, the first belt of the memory, the second belt of the memory, and the third belt of the memory are components of a band of the memory. Further, the first belt of the memory, the second belt of the memory, and the third belt of the memory may each include a respective plurality of dies, and each respective die of each respective plurality of dies may include a plurality of memory blocks.

In some embodiments, the first belt of the memory includes a first user area and a first system area, where the first user area includes the first set of memory blocks, and the second belt of the memory includes a second user area and a second system area, where the second system area includes the first parity area.

In some embodiments, calculating the second parity data is further based on the first parity data.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, and/or characteristic included in at least one implementation. Thus, phrases such as "in some embodiments" appearing herein describe various embodiments and implementations, and do not necessarily all refer to the same one or more embodiment. However, they are also not necessarily mutually exclusive. In the drawings.

DETAILED DESCRIPTION

Figure 1:
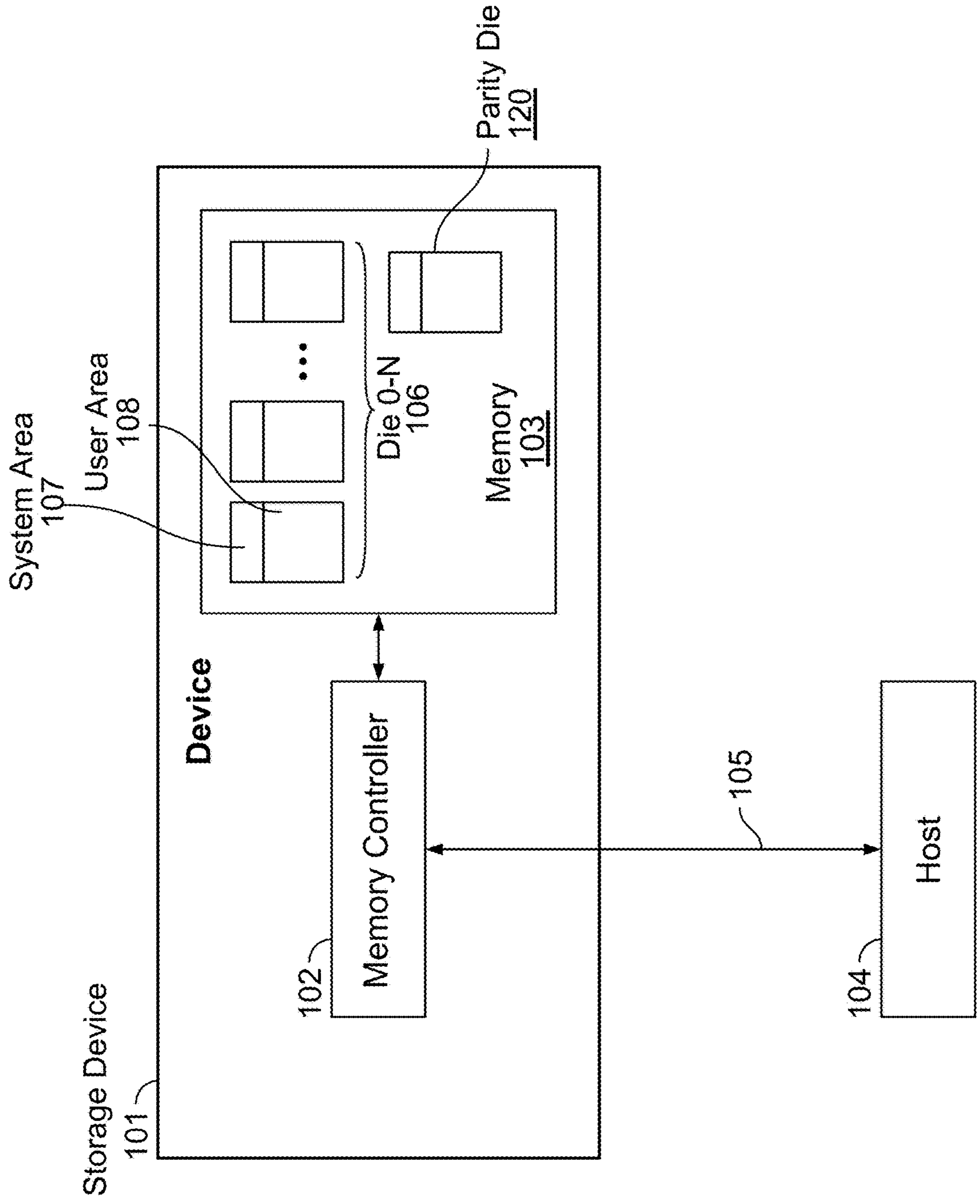
FIG. 1 shows an illustrative system including a storage device and a host in accordance with some embodiments of the present disclosure.

In accordance with the present disclosure, systems and methods are provided for cascaded writing of parity data (and, optionally, other data) during operation of storage devices (e.g., solid-state devices (SSDs) or any other suitable memory storage device). As used herein, a multi-level cell (MLC) may refer to any memory cell that holds more than one bit of data (e.g., a three-level cell (TLC), quad-level cell (QLC), five-level cell (PLC), or more). This feature of storing multiple bits per cell distinguishes an MLC from a single-level cell (SLC), which can store only one bit per memory cell.

Therefore, compared to SLCs, using MLCs in storage devices provides for storing more data in the same number of cells. When using MLCs instead of SLCs, a smaller memory array can be used to store the same total memory capacity, or the total memory capacity of the storage device can be increased using a similar-sized array. However, this increased memory capacity of MLCs may be associated with functional tradeoffs, e.g., due to MLCs typically having higher operational complexity, lower performance (e.g., lower speeds), and lower endurance (e.g., supporting a fewer number of write/erase cycles) than SLCs. For example, configuring MLCs to store data that can subsequently be read may require a multi-pass programming scheme (e.g., a 16:16 algorithm, such as may be used in connection with foggy/fine programming scheme), and multi-pass programming schemes require data (e.g., data stored in memory, and parity data based on the data stored in memory) to be cached between respective passes of the scheme (e.g., between the foggy/fine steps).

As memory blocks (e.g., such as NAND memory blocks) are made larger, e.g., in connection with increased numbers of wordlines and/or pages per block, the required amount of data caching between passes increases significantly. This cached data (e.g., including, but not limited to, parity data) may be stored in volatile memory (e.g., including, but not limited to, DRAM). However, increases in the amount of cached data can become difficult to support during a power loss imminent (PLI) event (e.g., in response to a power outage) because data written to volatile memory typically needs to be further written to non-volatile memory during a PLI event, and writing to non-volatile memory consumes capacitor energy during the PLI event. Thus, increasing the amount of data caching may require increasing the size of such a capacitor. However, it may not be desirable to increase capacitor size, e.g., due to the capacitor size conflicting with storage device miniaturization, reliability, and energy efficiency goals. To address this issue, storage devices described in embodiments of the present disclosure may perform cascaded writing of parity data, and optionally additional data, to increase data storage volumes without requiring ever-increasingly large capacitors.

In storage devices (e.g., SSDs), memory bands may be disposed to include a certain number of blocks per plane per die, and may be utilized during any suitable memory operation (e.g., write, read, erase, any other memory operation, or any combination thereof). For example, blocks “0” through “N” (where N may be any suitable integer, e.g., to indicate the total number of user blocks in the die) of a shared plane that is spread across respective dies of a storage device may together form a band. Bands may further be divided into belts (e.g., in a belt architecture), where each belt includes a certain number of dies in the band. A belt architecture may increase operational (e.g., program/read/erase) speeds by allowing multiple queues to be processed simultaneously. For example, blocks 0-N in plane 0 of dies 0-31 may form belt B0. In some operations, incoming data to-be-stored is written to a corresponding number of blocks (e.g., blocks 0-3) in a belt, after which parity data based on the data stored in the blocks is calculated and written to cache memory (e.g., DRAM).

In some embodiments, to store parity data (e.g., that is calculated using XOR operations) using a belt architecture, a parity die can be included for each belt. The parity data may then be kept persistent during PLI events by storing the parity data in persistent memory (e.g., NAND cells such as SLC) of the respective parity dies. A final parity data is calculated using the parity data in each of the respective parity dies and stored in a separate final parity die. However, this solution leads to an increase in the number of dies needed for a given total device capacity (e.g., 32 TB, 64 TB, or more) because a respective parity die is reserved in each belt (and these respective parity dies may, e.g., be included on top of a final parity die that is located outside the belts and reserved for final parity data).

In accordance with some embodiments of the present disclosure, only one parity die is needed. Such a memory architecture is made possible based on how methods and systems provided in this disclosure can reduce reduction the required parity memory (e.g., parity dies). During a cascaded write, parity (e.g., XOR) data is written in a sequential manner through respective parity areas (e.g., SLCs) of the belts before being finally written to the parity die outside the belts. The cascading of parity data through respective parity areas can be done in addition to cascading host data between different dies. The writing may be described as cascaded because each chunk of parity data may be written and erased from at least one respective portion of parity memory allocated on at least one respective memory die, where the memory dies are arranged as a belt, before being written to the final parity die.

In accordance with some embodiments of the present disclosure, processing circuitry (e.g., memory controller) of a storage device (e.g., SSD) calculates parity data after a write operation on a set of user blocks (e.g., blocks 0-3) in a first belt. The processing circuitry may write the parity data to parity area (e.g., SLCs) in the system area of a second belt. The processing circuitry may further erase the parity data from the system area of the second belt after cascading it to a third belt, or after writing the parity data (which may be regarded as final parity data) to designated parity memory (e.g., which may be located on a final parity die) outside any of the belts.

In some embodiments, the parity areas are in the system areas of the dies, whereas the user blocks are in the user areas of the dies.

In some embodiments, the parity areas in the belts include SLCs, e.g., to benefit from the higher endurance, greater throughput, improved power efficiency, or any combination thereof of SLCs as compared to MLCs.

The subject matter of this disclosure is further discussed with reference to FIGS. 1-4.

FIG. 1 shows a system that includes a storage device 101 that is communicatively coupled to a host 104 (e.g., a host device), in accordance with some embodiments of the present disclosure. Storage device 101 includes a memory controller 102 and memory 103. Memory 103 may include several dies 0-N 106 and at least one parity die 120 (e.g., of non-volatile memory (e.g., NAND or NOR). Each die, including the parity die 120, includes a system area 107 (e.g., for storing data related to operation of the memory device) and a user area 108 (e.g., for storing data, such as user data, that is to be retrieved from the memory device), as indicated by the respective lines drawn across each die. A system area 107 may include memory to store security data, maintenance data, temporary parity data, any other system data, or any combination thereof. A user area 108 may include memory (e.g., user blocks) to store user data. In some embodiments, the memory controller 102 may include additional memory (e.g., DRAM) that is separate from memory 103 (e.g., NAND or NOR) of the storage device 101; such additional memory may be referred to as memory of the memory controller (e.g., which may store system memory, such as applications related to operating the memory controller, or such as data similar to that stored in system area 107). Logical rules and protocols for operating storage device 101 and host 104 may be established by certain operational specifications (e.g., NVMe, PCIe, SATA, any other suitable transport protocol specifications, or any combination thereof).

Host 104 (e.g., processing circuitry of host 104) is configured to send read, write, and erase commands to storage device 101. Memory controller 102 is configured to receive, interpret, and act on the read, write, and erase commands sent by the host 104. Memory controller 102 is further configured to execute these commands on memory 103 such that a series of operations may cause memory 103 to be in a state that reflects the outcomes of the data operations.

A data operation (e.g., read, write, or erase) may be performed in response to one or more commands 105 (e.g., where the commands are to perform the operation). In some embodiments, commands 105 may also include additional information for the SLC reads (e.g., page location, program-erase count, and/or read level shift). In some embodiments, a single command 105 may be issued for multi-phase programming of MLCs during an SLC copyback operation. As used herein, multi-phase programming may refer to a multi-pass scheme where a first pass of programming sets the threshold voltage distribution of MLCs at their target values, but with relatively wide gaussian distributions (e.g., as a first foggy/rough programming operation), and subsequent passes narrow these relatively wide distributions to improve the accuracy of reading from the MLCs using the respective threshold voltages (e.g., where the subsequent passes are fine programming operations).

In some embodiments, storage device 101 is an SSD device. An SSD device is a data storage device that uses multiple semiconductor cells (e.g., SLCs and/or MLCs) arranged in an array to persistently store data. SSDs have no moving components, distinguishing SSDs from traditional electromechanical magnetic disks, such as hard disk drives (HDDs) or floppy disks, which contain spinning disks and movable read/write heads. Compared to electromechanical disks, SSDs are typically more resistant to physical shock, run silently, have lower access time, and have less latency. SSDs use indirect memory addressing, which stores data into a next available physical memory address and maps the next available physical memory address to the logical memory address within an indirection table. In some embodiments, the semiconductor cell array of the SSD uses a NAND flash (e.g., 3D NAND) architecture. In some embodiments, the SSD device can be single-plane or multi-plane (i.e., 2 or more planes). Multi-plane SSD devices allow for parallel operations to occur across different planes of a single device.

Figure 2:
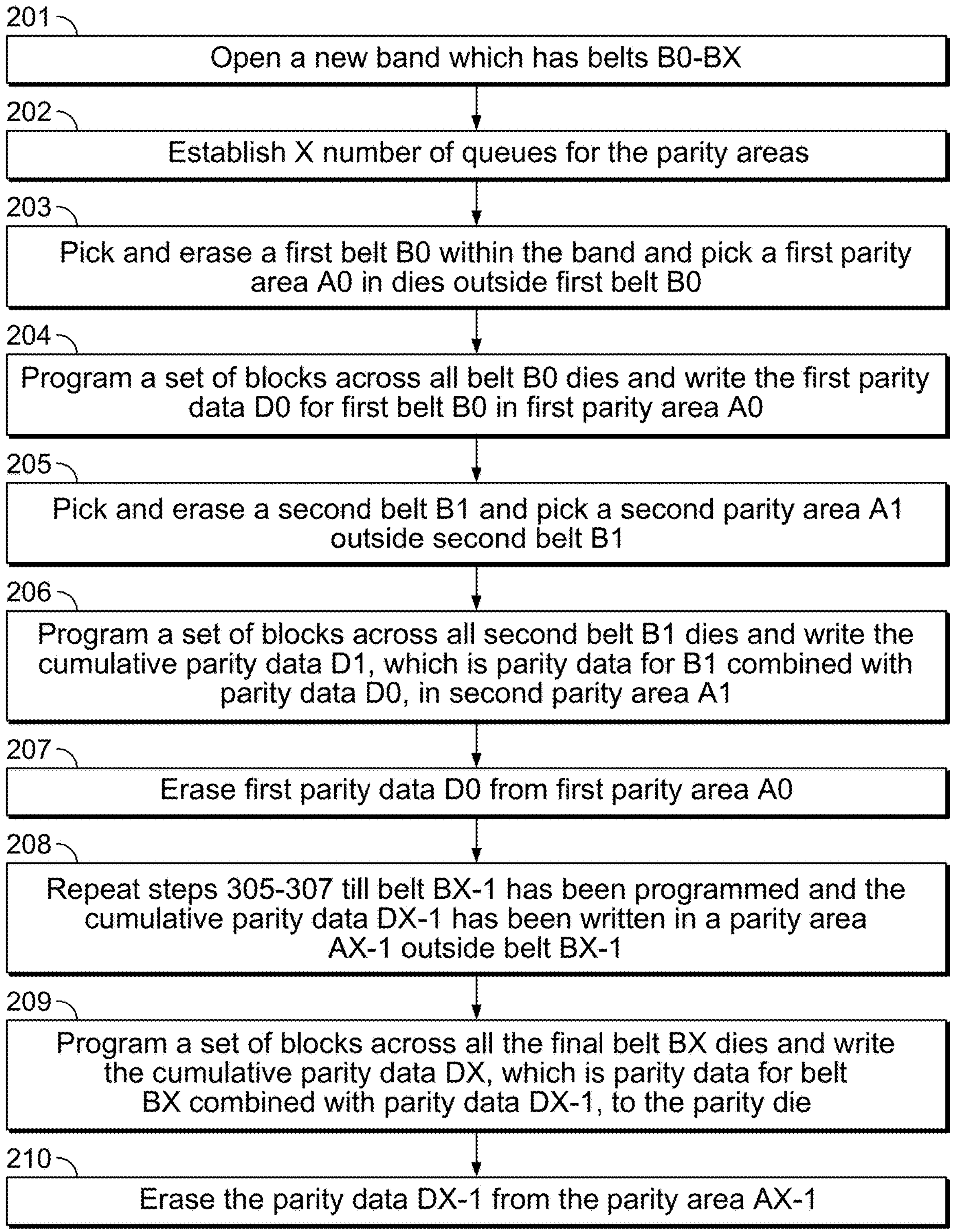
FIG. 2 shows an illustrative flowchart of a write operation with cascaded parity writing in accordance with some embodiments of the present disclosure.

FIG. 2 shows an illustrative flowchart of a write operation with cascaded parity writing, in accordance with some embodiments of the present disclosure. In some embodiments, the host 104 issues commands that cause a method corresponding to the flowchart of FIG. 2 to be executed as part of a writing operation (in whole or part) at the storage device 101.

At step 201, controller 102 accesses a new band in the memory 103, where the band is stored across dies 0-N 106. The band is further divided into including belts B0-BX, where X is any suitable integer. At step 202, controller 102 establishes X number of queues for the parity areas in the system areas 107 in each belt. Each queue includes a command that causes the controller 102 to execute a write operation at a certain set of blocks (e.g., blocks 0-4) across the dies. At step 203, the controller 102 selects (e.g., according to any suitable algorithm, such as a sequential algorithm) and erases a first belt B0 within the band and selects a first parity area A0 in dies outside first belt B0, in the system areas of any of the other belts.

At step 204, the controller 102 programs (e.g., during a foggy/fine programming operation) a first set of blocks across all belt B0 dies in memory 103 and writes the first parity data D0 for first belt B0 in first parity area A1, where A1 is outside belt B0. At step 205, the controller 102 selects (e.g., according to any suitable algorithm, such as a sequential algorithm) and erases a second belt B1, and selects a second parity area A0 (e.g., which may be a part of belt B0, or a part of any other belt) outside second belt B1. At step 206, the controller 102 programs a set of blocks across all second belt B1 dies and writes the cumulative parity data D3, which is parity data for B1 (e.g., D1) combined with parity data D0, as stored in the second parity area A1. At step 207, the controller 102 erases the first parity data D1 from the first parity area A0.

At step 208, steps 305-307 are repeated until a set of blocks in a penultimate belt BX-1 has been programmed and the cumulative parity data DX-1 of the programmed belts have been written in a penultimate parity area AX-1, outside penultimate belt BX-1. At step 209, the controller 102 programs a set of blocks across dies of a final belt BX and writes the cumulative parity data DX, which is the parity data for belt BX combined with parity data DX-1, in the designated parity memory (e.g., parity die 120 outside the dies 0-N 106). At step 210, the controller 102 erases the penultimate parity data DX-1 from the penultimate parity area AX-1.

Figure 3:
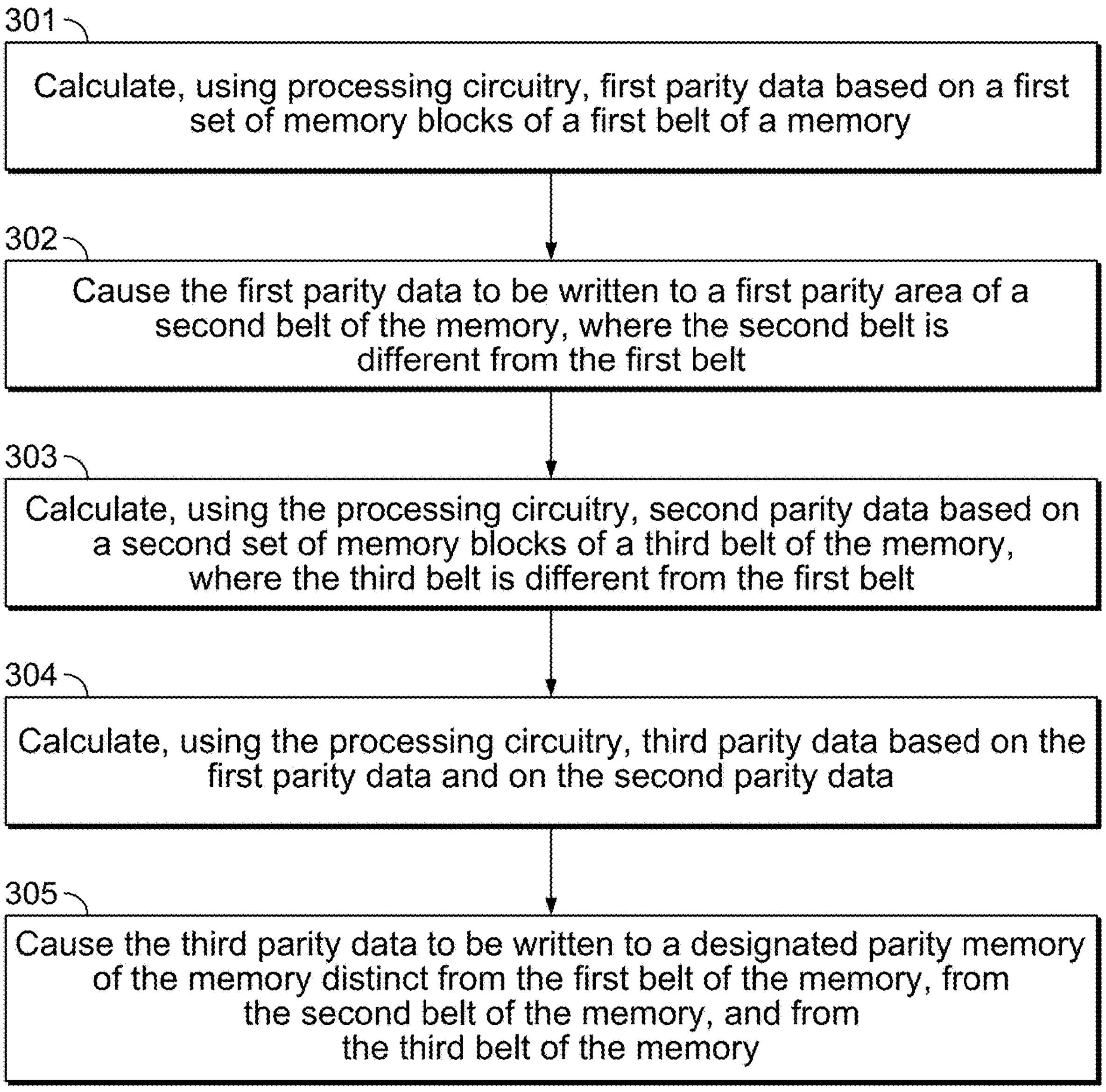
FIG. 3 shows an illustrative flowchart of a write operation with cascaded parity writing in accordance with some embodiments of the present disclosure.

FIG. 3 shows an illustrative flowchart of a write operation with cascaded parity writing, in accordance with some embodiments of the present disclosure. In some embodiments, the host 104 performs the writing operation of FIG. 3 at the storage device 101.

At step 301, the controller 102 calculates first parity data (e.g., parity data D0 450) based on a first set of memory blocks of a first belt of a memory 103 (e.g., belt B0 410). In some embodiments, the calculation may use an initial parity data as part of the parity operation. The initial parity data may have been obtained from previous write operations on memory 103.

At step 302, the controller 102 writes the first parity data to a first parity area (e.g., to SLCs of a system area, such as system area 421) of a second belt of the memory 103 (e.g., belt B1 411), where the second belt is different from the first belt.

At step 303, the controller 102 calculates second parity data (e.g., parity data D1 451, or parity data D2 452) based on a second set of memory blocks of a third belt (e.g., belt B1 411, if the third belt is the same as the second belt, or belt B2 412, if the third belt is separate from the second belt) of the memory 103, where the third belt is different from the first belt. In some embodiments, the third belt may be the same as the second belt.

At step 304, the controller 102 calculates third parity data (e.g., parity data D3 453) based on the first parity data and on the second parity data.

At step 305, the controller 102 writes the third parity data to a designated parity memory (e.g., to a parity die outside any of the belts, or to designated parity memory of a belt that is separate from all the belts storing data which were used to generate the third parity data) of the memory 103. The designated parity memory is distinct from the first belt of the memory 103, from the second belt of the memory 103, and from the third belt of the memory 103.

FIGS. 4A-4E show schematic representations of a write operation with cascaded parity writing, in accordance with some embodiments of the present disclosure. In FIGS. 4A-4E, a band 401 includes 4 belts belt B0 410, belt B1 411, belt B2 412, belt B3 413. Each of the 4 belts (i.e., belt B0 410, belt B1 411, belt B2 412, belt B3 413) includes 32 dies, adding up to 128 dies in total across the 4 belts. Belt B0 410 includes dies 0-31, belt B1 411 includes dies 32-63, belt B2 412 includes dies 64-95, and belt B3 413 includes dies 96-127. Each die in each belt includes a system area 402, and a user area 403. The system area 402 of each die includes a parity area which may include SLCs. The user area 403 of each die in dies 0-127 includes several blocks 0-N, where N is an integer. In some embodiments, N may be any suitable integer; for example N may be over 1,000. A parity die 440 lies outside any of the belts, belt B0 410, belt B1 411, belt B2 412, and belt B3 413.

Figure 4A:
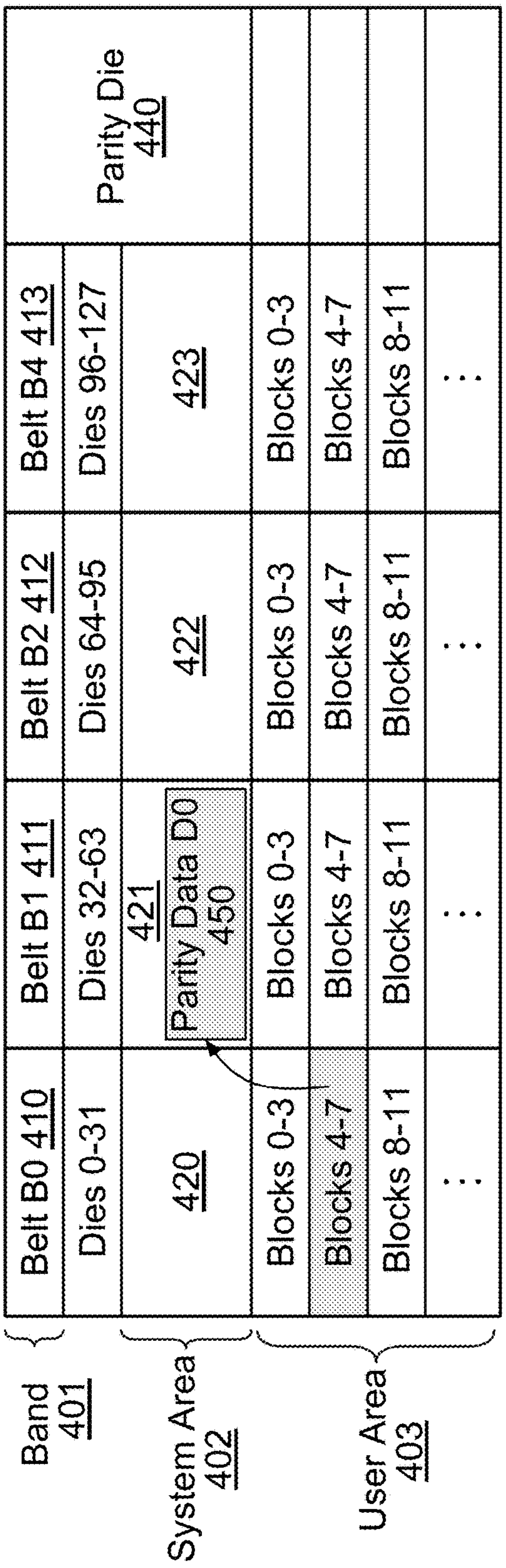
FIG. 4A shows a schematic representation of a first illustrative write operation of a cascaded parity write in accordance with some embodiments of the present disclosure.

In FIG. 4A, the controller 102 selects (e.g., according to a write algorithm, sequentially, etc.) blocks 4-7 in belt B0 410, and conditions (e.g., erases) the blocks 4-7 for programming. The controller 102 programs (e.g., writes data to) blocks 4-7 of belt B0 410, calculates (e.g., using XOR) parity data D0 450 for the blocks 4-7 of belt B0 410, and writes the parity data D0 450 to a parity area 421 of belt B1 411.

Figure 4B:
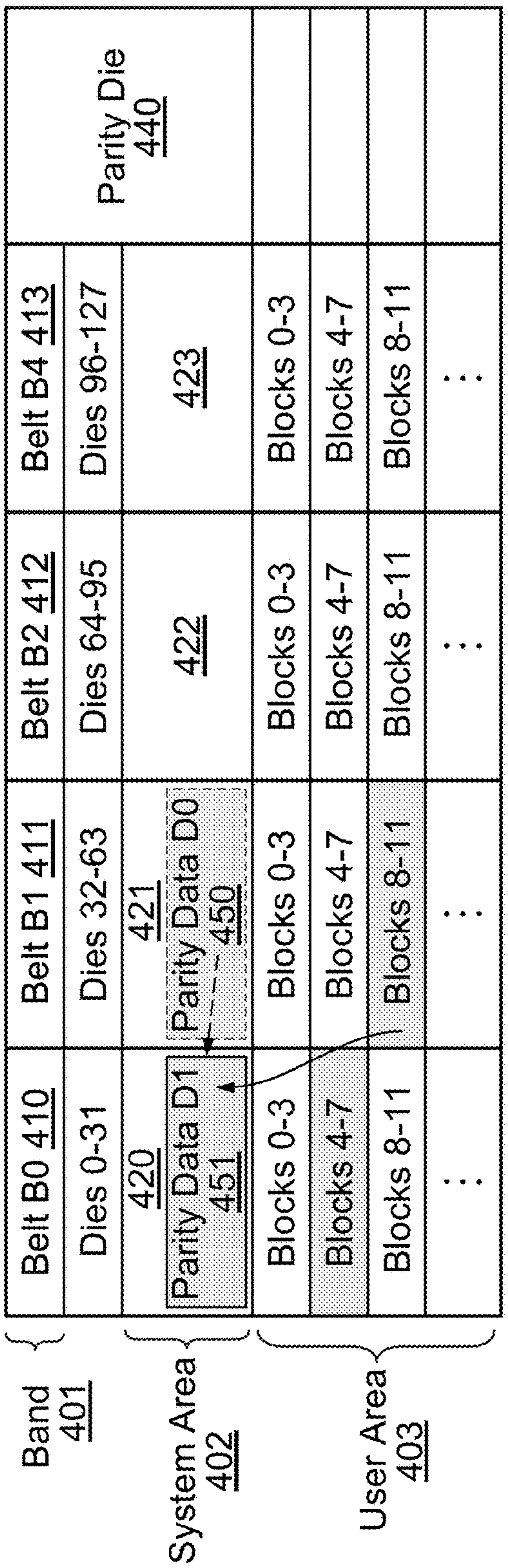
FIG. 4B shows a schematic representation of a second illustrative write operation of a cascaded parity write in accordance with some embodiments of the present disclosure.

In FIG. 4B, the controller 102 selects (e.g., according to a write algorithm, sequentially, etc.) blocks 8-11 in belt B1 411, and conditions the blocks 8-11 for programming. The controller 102 programs (e.g., writes data to) blocks 8-11 of belt B1 411, calculates parity data D1 451 for the blocks 8-11 of belt B1 411 using parity data D0 450 (e.g., by sequential XOR), and writes the cumulative parity data D1 451 to a parity area 420 of belt B0 410. Sequential XOR may comprise calculating an intermediate parity data for the blocks 8-11 of belt B1 411 and then calculating parity data D1 451 using the intermediate parity data and parity data D0 450. The controller 102 erases parity data D0 450 from belt B1 411 after the cumulative parity data D1 451 has been written to parity area 420.

Figure 4C:
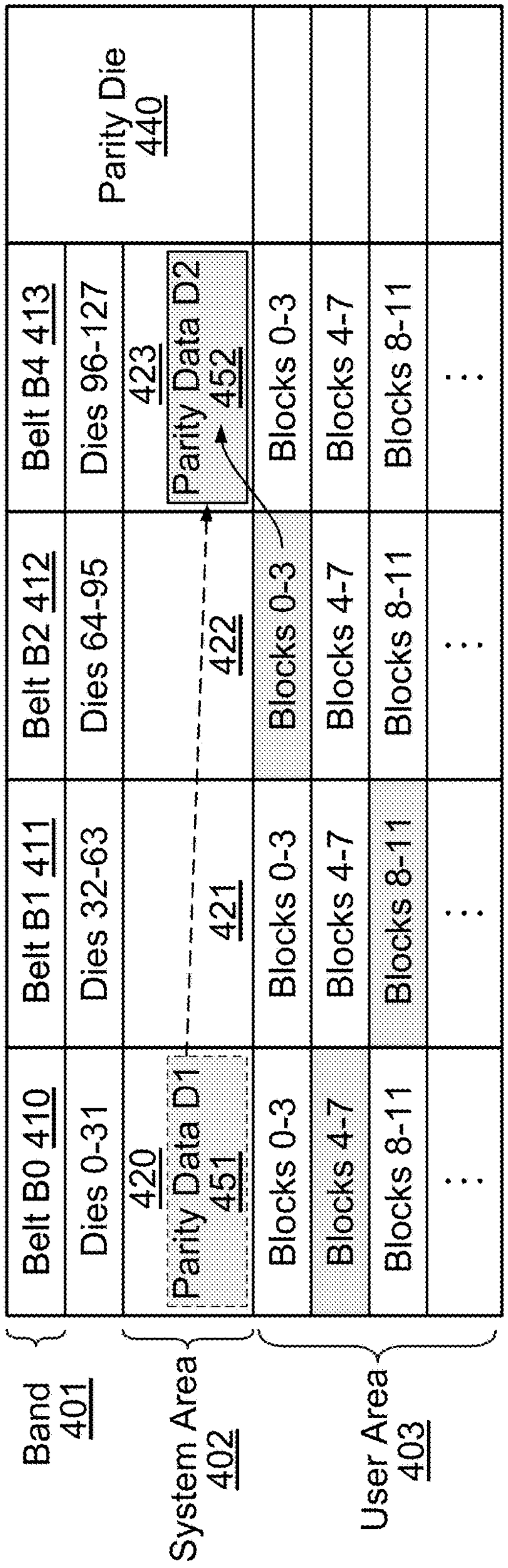
FIG. 4C shows a schematic representation of a third illustrative write operation of a cascaded parity write in accordance with some embodiments of the present disclosure.

In FIG. 4C, the controller 102 selects (e.g., according to a write algorithm, sequentially, etc.) blocks 0-3 in belt B2 412, and conditions the blocks 0-3 for programming. The controller 102 programs (e.g., writes data to) blocks 0-3 of belt B2 412, calculates (e.g., using XOR) parity data D2 452 for the blocks 0-3 of belt B2 412 using parity data D1 451 (e.g., by sequential XOR), and writes the cumulative parity data D2 452 to a parity area 423 of belt B3 413. The controller 102 erases parity data D1 451 from belt B0 410 after the cumulative parity data D2 452 has been written to parity area 423.

Figure 4D:
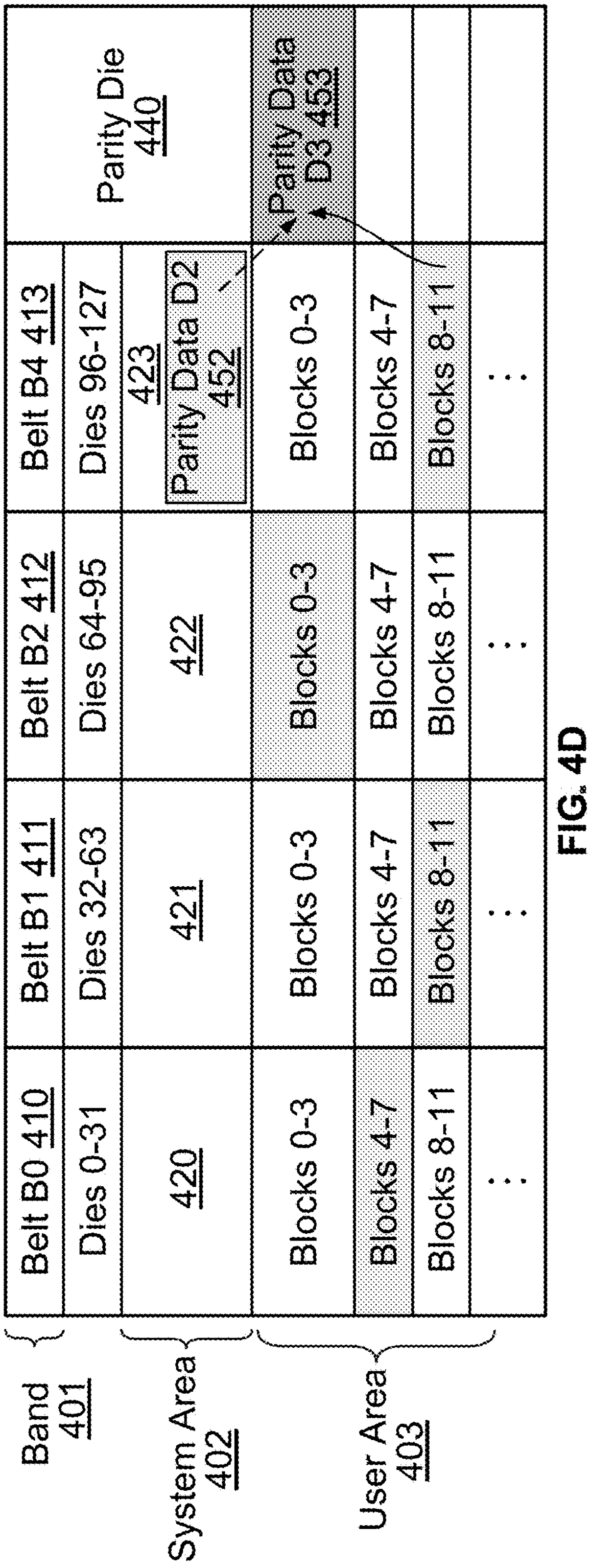
FIG. 4D shows a schematic representation of a fourth illustrative write operation of a cascaded parity write in accordance with some embodiments of the present disclosure.

In FIG. 4D, the controller 102 selects (e.g., according to a write algorithm, sequentially, etc.) blocks 8-11 in belt B3 413, and conditions the blocks 8-11 for programming. The controller 102 programs (e.g., writes data to) blocks 8-11 of belt B3 413, calculates (e.g., using XOR) parity data D3 453 for the blocks 8-11 of belt B3 413 using parity data D2 452 (e.g., by sequential XOR), and writes the cumulative parity data D3 453 to the parity die 440 outside belts B0-B3. The controller 102 erases parity data D2 452 from belt B3 413 after the cumulative parity data D3 453 has been written to parity die 440.

Figure 4E:
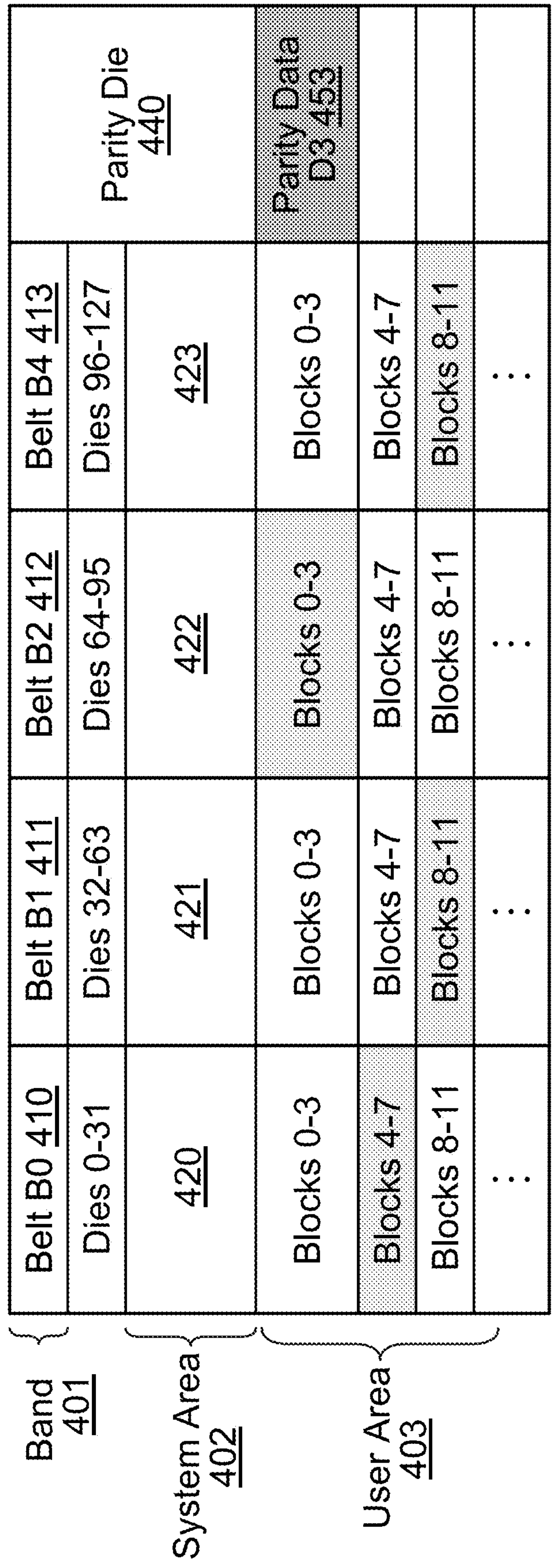
FIG. 4E show a schematic representation of a fifth illustrative write operation of a cascaded parity write in accordance with some embodiments of the present disclosure.

FIG. 4E shows the cumulative parity data D3 453 from certain sets of blocks (e.g., blocks 4-7 of belt B0 410, blocks 8-11 of belt B1 411, blocks 0-3 of belt B2 412, and blocks 8-11 of belt B3 413) across the band 401 written in the parity die 440. In some embodiments, the system area 402 of the dies 0-127 in the band 401 do not contain any parity data that was used in the calculation of parity data 453.

Thus, methods and systems for memory belt architecture management have been provided among embodiments of the subject matter disclosed herein.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments. Further, although process steps, method steps, algorithms or the like may be described in a sequential order, such processes, methods, and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

What is claimed is:

1. A method for storing data in a memory comprising a band, the band comprising a shared plane across a plurality of dies, the band partitionable into one or more belts each associated with one or more respective dies of the plurality of dies, the method comprising:

calculating, using processing circuitry, first parity data based on a first set of memory blocks of a first belt of the memory;

causing the first parity data to be written to a first parity area of a second belt of the memory, wherein the second belt is different from the first belt;

calculating, using the processing circuitry, second parity data based on a second set of memory blocks of a third belt of the memory, wherein the third belt is different from the first belt and the third belt is the same as the second belt;

calculating, using the processing circuitry, third parity data based on the first parity data and on the second parity data; and causing the third parity data to be written to a designated parity memory of the memory distinct from the first belt of the memory, from the second belt of the memory, and from the third belt of the memory.

2. The method of claim 1, wherein the method further comprises:

causing the first parity data to be erased from the first parity area after writing the third parity data to the designated parity memory of the memory.

3. The method of claim 1, wherein calculating the first parity data, the second parity data, and the third parity data comprises using one or more XOR operations.

4. The method of claim 1, wherein the first set of memory blocks and the second set of memory blocks comprise quad-level cell (QLC) blocks.

5. The method of claim 1, wherein the first parity area comprises single-layer cell (SLC) blocks.

6. The method of claim 1, wherein the designated parity memory of the memory is a parity die.

7. The method of claim 1, wherein:

the first belt of the memory, the second belt of the memory, and the third belt of the memory are components of a band of the memory;

the first belt of the memory, the second belt of the memory, and the third belt of the memory each comprise a respective plurality of dies; and each respective die of each respective plurality of dies comprises a plurality of memory blocks.

8. The method of claim 1, wherein:

the first belt of the memory comprises a first user area and a first system area, wherein the first user area comprises the first set of memory blocks; and the second belt of the memory comprises a second user area and a second system area, wherein the second system area comprises the first parity area.

9. The method of claim 1, wherein calculating the second parity data is further based on the first parity data.

10. A memory storage device comprising:

memory comprising a band, the band comprising a shared plane across a plurality of dies, the band partitionable into one or more belts each associated with one or more respective dies of the plurality of dies; and processing circuitry coupled to the memory, the processing circuitry to:

calculate first parity data based on a first set of memory blocks of a first belt of the memory;

cause the first parity data to be written to a first parity area of a second belt of the memory, wherein the second belt is different from the first belt;

calculate second parity data based on a second set of memory blocks of a third belt of the memory, wherein the third belt is different from the first belt and the third belt is the same as the second belt;

calculate third parity data based on the first parity data and on the second parity data; and cause the third parity data to be written to a designated parity memory of the memory distinct from the first belt of the memory, from the second belt of the memory, and from the third belt of the memory.

11. The memory storage device of claim 10, wherein the processing circuitry is further to:

cause the first parity data to be erased from the first parity area after writing the third parity data to the designated parity memory of the memory.

12. The memory storage device of claim 10, wherein calculating the first parity data, the second parity data, and the third parity data comprises using one or more XOR operations.

13. The memory storage device of claim 10, wherein the first set of memory blocks and the second set of memory blocks comprise quad-level cell (QLC) blocks.

14. The memory storage device of claim 10, wherein the first parity area comprises single-layer cell (SLC) blocks.

15. The memory storage device of claim 10, wherein the designated parity memory of the memory is a parity die.

16. The memory storage device of claim 10, wherein:

the first belt of the memory, the second belt of the memory, and the third belt of the memory are components of a band of the memory;

the first belt of the memory, the second belt of the memory, and the third belt of the memory each comprise a respective plurality of dies; and each respective die of each respective plurality of dies comprises a plurality of memory blocks.

17. The memory storage device of claim 10, wherein:

the first belt of the memory comprises a first user area and a first system area, wherein the first user area comprises the first set of memory blocks; and the second belt of the memory comprises a second user area and a second system area, wherein the second system area comprises the first parity area.

18. The memory storage device of claim 10, wherein calculating the second parity data is further based on the first parity data.

* * * * *